United States Patent
Lee et al.

(10) Patent No.: US 7,292,734 B2
(45) Date of Patent: Nov. 6, 2007

(54) BLACK AND WHITE STRETCHING SYSTEM AND METHOD FOR IMPROVING CONTRAST OF A PICTURE

(75) Inventors: Sang-soo Lee, Seoul (KR); Ho-nam Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 728 days.

(21) Appl. No.: 10/830,400

(22) Filed: Apr. 23, 2004

(65) Prior Publication Data

US 2005/0031200 A1   Feb. 10, 2005

(30) Foreign Application Priority Data

Aug. 9, 2003  (KR) .................. 10-2003-0055232

(51) Int. Cl.
*G06K 9/40*  (2006.01)
(52) U.S. Cl. ...................... 382/274; 382/169
(58) Field of Classification Search ................ 382/168, 382/169, 260, 261, 274; 348/671, 672, 678
See application file for complete search history.

(56) References Cited

U.S. PATENT DOCUMENTS 5,854,851 A * 12/1998 Bamberger et al. ......... 382/132

| | | | |
|---|---|---|---|
| 6,148,103 A | 11/2000 | Nenonen | |
| 6,611,296 B1 * | 8/2003 | Nieuwenhuizen et al. | .. 348/625 |

FOREIGN PATENT DOCUMENTS

| JP | 07-281633 A | 10/1995 |
|---|---|---|
| JP | 10-126647 A | 5/1998 |
| JP | 2000-057335 A | 2/2000 |
| KR | 2000-0039940 A | 7/2000 |

* cited by examiner

*Primary Examiner*—Phuoc Tran
(74) *Attorney, Agent, or Firm*—Sughrue Mion Pllc.

(57) ABSTRACT

A black and white stretching system and method for improving contrast of a picture is disclosed. The system includes a histogram distribution calculation unit for calculating a histogram distribution of an input signal of a specified unit, a mean calculation unit for calculating a mean level of the input image signal, a slope calculation unit for calculating black and white stretching slopes in association with the mean level, a ratio calculation unit for calculating a ratio of a picture change based on the histogram distribution of the present input image signal and the previous input image signal, a filtering unit for adjusting the black and white stretching slopes corresponding to the ratio of the picture change, and a stretching unit for stretching the input image signal by mapping the adjusted black and white stretching slopes and the input image signal.

18 Claims, 4 Drawing Sheets

BLACK AND WHITE STRETCHING SYSTEM AND METHOD FOR IMPROVING CONTRAST OF A PICTURE

This application claims the benefit of Korean Patent Application No. 2003-55232 filed Aug. 9, 2003 in the Korean Intellectual Property Office, the disclosure of which is incorporated herein by reference.

BACKGROUND

1. Field of the Invention

The present invention relates to a black and white stretching system in an image processing system for processing an image signal, and more particularly, to a black and white stretching system and method which can adaptively stretch the level of an input image signal to a mean level and can improve the efficiency of removing a flicker phenomenon of a picture by varying a filter coefficient by using histogram information.

2. Description of the Related Art

Generally, according to the image signal process of a conventional image processing system, the distribution of the dynamic range of the level of an input image signal is smaller than that of the hardware range of the image signal process. Typically, resolution is increased through the use of a black and white stretching system. The system stretches the dynamic range of the level of the image signal so that the range is increased to near that of the hardware range. Hereinafter, the term "image signal" refers to a brightness signal, one of among many signals which form a complete image.

Figure 1:
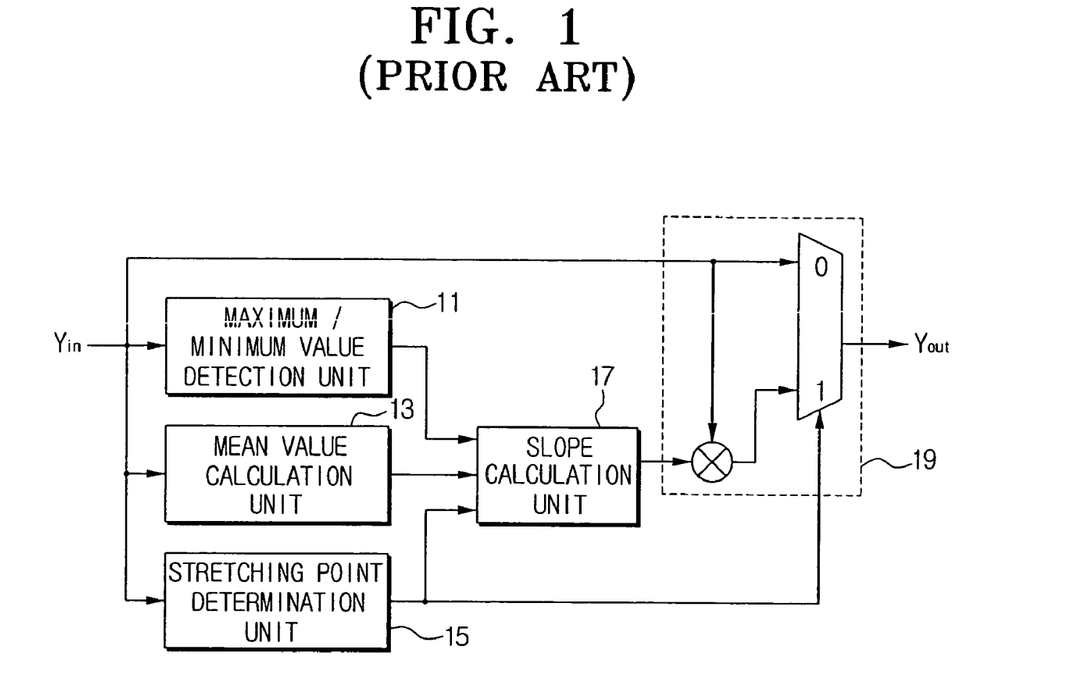
FIG. 1 is a schematic block diagram of a conventional black and white stretching system.
Figure 2A:
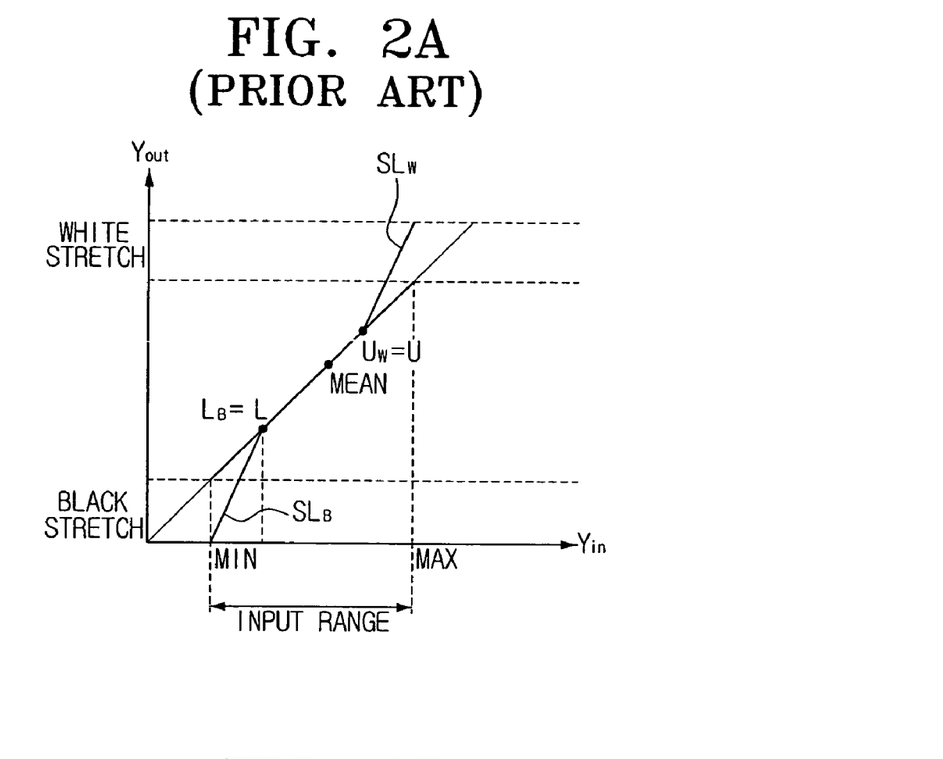
FIGS. 2A and 2B are views explaining a stretching process performed by the black and white stretching system illustrated in FIG. 1.
Figure 2B:
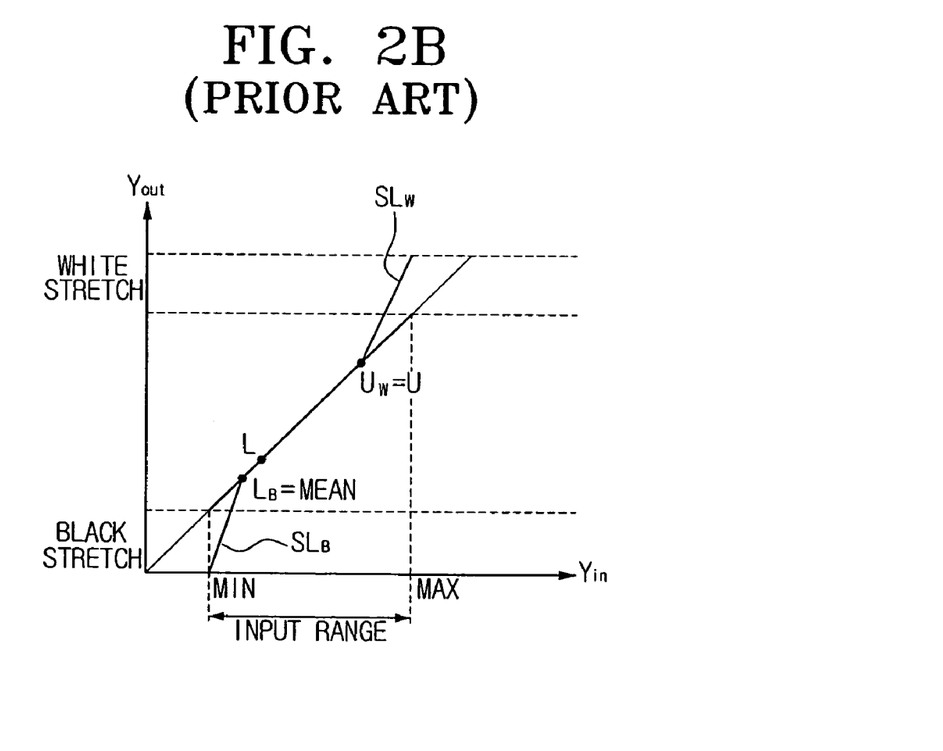

FIG. 1 is a schematic block diagram of a conventional black and white stretching system. FIGS. 2A and 2B are views explaining a conventional method of stretching an input image signal performed by the black and white stretching system illustrated in FIG. 1.

The black and white stretching system has a maximum/minimum detection unit 11, a mean calculation unit 13, a stretching point determination unit 15, a stretching function generation unit 17, and a stretching unit 19.

The maximum/minimum detection unit 11 detects the maximum value and the minimum value of an input image signal, i.e., a brightness signal, and the mean calculation unit 13 calculates the mean value of the input image signal.

The stretching point determination unit 15 determines stretching points $L_B$ and $U_W$ corresponding to a dynamic range of the input image signal by comparing predetermined stretching points L and U with the calculated mean value. Specifically, the lesser of a predetermined stretching point L and the mean value is determined to be the black stretching point $L_B$. The greater of a predetermined stretching point U and the mean value is determined to be the white stretching point $U_W$.

The slope calculation unit 17 calculates a black stretching slope $SL_B$ using the detected minimum value, mean value and black stretching point $L_B$, and calculates a white stretching slope $SL_W$ using the detected maximum value, mean value and white stretching point $U_W$.

The stretching unit 19 stretches the range of a gray level of the input image signal to the hardware range by mapping the calculated black stretching slope $SL_B$ and the white stretching slope $SL_W$ onto the input image signal.

FIGS. 2A and 2B are views explaining the stretching of an input image signal performed by the conventional black and white stretching system.

As shown in FIG. 2A, if the mean value of the input image signal lies between the predetermined stretching points L and U, the predetermined stretching points L and U are determined by the stretching point determination unit 15 to be the black and white stretching points $L_B$ and $U_W$, respectively. Thus, the improvement of the contrast of the picture can be expected. However, as shown in FIG. 2B, if the mean value of the input image signal is less than the value of the predetermined stretching point L, the mean value is determined to be the black stretching point, and the corresponding black stretching slope $SL_B$ is obtained.

Through this system, the image signal mapping on the black stretching slope $SL_B$ can obtain an excellent contrast effect in a dark picture, but in a bright picture, the contrast effect is relatively degraded due to the white stretching slope $SL_W$ according to the white stretching point $U_W$ to which the mean value is not applied.

Accordingly, the conventional stretching system has the problem that the optimum contrast effect cannot be obtained because the stretching slopes are irrespective of the change of the mean value in the dark and bright pictures.

Additionally, the conventional stretching system uses a simple filter (not illustrated) with a fixed filter coefficient in order to remove the flicker phenomenon of the picture generated by the above-described stretching. With a simple filter, if there is any scene change or change of the picture, information of the previous picture is accumulated and reflected in the present picture in the fixed ratio. Thus, the removing efficiency of the flicker phenomenon of the picture deteriorates due to the unnatural change of the picture and the change of the gray level.

SUMMARY

In an effort to solve the problems as described above, it is an aspect of the present invention to provide a black and white stretching system and method, which can adaptively stretch to the mean value of an input image signal, and to improve the efficiency of removing a flicker phenomenon of a picture by varying a filter coefficient using histogram information.

To achieve the above aspect and other features of the present invention, there is provided a black and white stretching system including a histogram distribution calculation unit for calculating a histogram distribution of an input signal of a specified unit, a mean calculation unit for calculating a mean level of the input image signal, a slope calculation unit for calculating black and white stretching slopes in association with the mean level, a ratio calculation unit for calculating a ratio of a picture change on the basis of the histogram distribution of the present input image signal and the previous input image signal, a filtering unit for adjusting the black and white stretching slopes corresponding to the ratio of the picture change, and a stretching unit for stretching the input image signal by mapping the adjusted black and white stretching slopes and the input image signal.

The histogram distribution calculation unit detects a sum of the whole levels of the input image signal and the total number of pixels, and the mean calculation unit calculates the mean level of the input image signal using the sum of the whole levels and the total number of pixels. Also, the histogram distribution calculation unit detects a maximum level and a minimum level of the input image signal, and the slope calculation unit calculates black and white stretching points using the maximum level, the minimum level, the mean level, and preset stretching points.

The black and white stretching points $L_B$ and $U_W$ calculated by the slope calculation unit are expressed by the following equation, where L and U are the preset black and white stretching points, M is the mean level, and T is an association parameter.

$$L_B = L + \frac{M-L}{T}$$

$$U_W = U + \frac{M-U}{T}$$

The slope calculation unit calculates the black and white stretching slopes in association with the mean level using the calculated black and white stretching points, the minimum level, and the maximum level.

The black and white stretching system can further include a histogram information calculation unit for calculating histogram information data using the histogram distribution of the present input image signal and the previous input image signal calculated by the histogram distribution calculation unit, and the ratio calculation unit can calculate the ratio of the picture change using the histogram information data, and provides the ratio of the picture change to the filtering unit.

The histogram information data Diff_histo calculated by the histogram information calculation unit is given by the following equation, where H(i)P is the histogram distribution of the previous image signal, H(i)C is the histogram distribution of the present image signal, i is a gray level, and n and m are natural numbers.

$$\textit{Diff-histo} = \sum_{i=m}^{n}(H(i)_C - H(i)_P)$$

The ratio of the picture change (Coeff) calculated by the ratio calculation unit is given by the following equation, where Total is the total number of pixels of the input image signal.

$$\textit{Coeff} = \frac{\textit{Diff-histo}}{\text{Total}}$$

The filtering unit adjusts the present black and white stretching slopes such that if the ratio of the picture change is small, the filtering unit reflects the previous black and white stretching slopes corresponding to the previous input image signal relatively large in comparison to the present black and white stretching slopes corresponding to the present input image signal. If the ratio of the picture change is large, the filtering unit reflects the present black and white stretching slopes corresponding to the present input image signal relatively large in comparison to the previous black and white stretching slopes corresponding to the previous input image signal.

In another aspect of the present invention, there is provided a black and white stretching method including a histogram distribution calculation step of calculating a histogram distribution of an input signal of a specified unit, a mean calculation step of calculating a mean level of the input image signal, a slope calculation step of calculating black and white stretching slopes in association with the mean level, a ratio calculation step of calculating a ratio of a-picture change on the basis of the histogram distribution of the present input image signal and the previous input image signal, a filtering step of adjusting the black and white stretching slopes corresponding to the ratio of the picture change, and a stretching step of stretching the input image signal by mapping the adjusted black and white stretching slopes and the input image signal.

The histogram distribution calculation step detects a sum of whole levels of the input image signal and the total number of pixels, and the mean calculation step calculates the mean level of the input image signal using the sum of whole levels and the total number of pixels. Also, the histogram distribution calculation step detects a maximum level and a minimum level of the input image signal, and the slope calculation step calculates black and white stretching points using the maximum level, the minimum level, the mean level, and preset stretching points.

The black and white stretching points $L_B$ and $U_W$ calculated at the slope calculation step are expressed by the following equation, where L and U are the preset black and white stretching points, M is the mean level, and T is an association parameter.

$$L_B = L + \frac{M-L}{T}$$

$$U_W = U + \frac{M-U}{T}$$

The slope calculation step calculates the black and white stretching slopes in association with the mean level using the calculated black and white stretching points, the minimum level, and the maximum level.

The black and white stretching method can further include a histogram information calculation step of calculating histogram information data using the histogram distribution of the present input image signal and the previous input image signal calculated at the histogram distribution calculation step. The ratio calculation step calculates the ratio of the picture change using the histogram information data, and the filtering step adjusts the black and white stretching slopes on the basis of the ratio of the picture change.

The histogram information data Diff_histo calculated at the histogram information calculation step is given by the following equation, where H(i)P is the histogram distribution of the previous image signal, H(i)C is the histogram distribution of the present image signal, i is a gray level, and n and m are natural numbers.

$$\textit{Diff-histo} = \sum_{i=m}^{n}(H(i)_C - H(i)_P)$$

The ratio of the picture change (Coeff) calculated at the ratio calculation step is given by the following equation, where Total is the total number of pixels of the input image signal.

$$\textit{Coeff} = \frac{\textit{Diff-histo}}{\text{Total}}$$

The filtering step adjusts the present black and white stretching slopes such that if the ratio of the picture change is small, the filtering step reflects the previous black and white stretching slopes corresponding to the previous input image signal relatively large in comparison to the present black and white stretching slopes corresponding to the present input image signal. If the ratio of the picture change is large, the filtering step reflects the present black and white stretching slopes corresponding to the present input image signal relatively large in comparison to the previous black and white stretching slopes corresponding to the previous input image signal.

Accordingly, the optimum contrast effect can be obtained with respect to any image signal by variably calculating and mapping the black and white stretching slopes according to the mean level of the input image signal and the histogram information.

BRIEF DESCRIPTION OF THE DRAWINGS

The above objects and other advantages of the present invention will become more apparent by describing in detail an exemplary embodiment thereof with reference to the drawings in which.

DETAILED DESCRIPTION OF THE PREFERRED EMBODIMENTS

A black and white stretching system and method according to the present invention will be described in detail with reference to the drawings in which like reference numerals refer to like elements.

Figure 3:
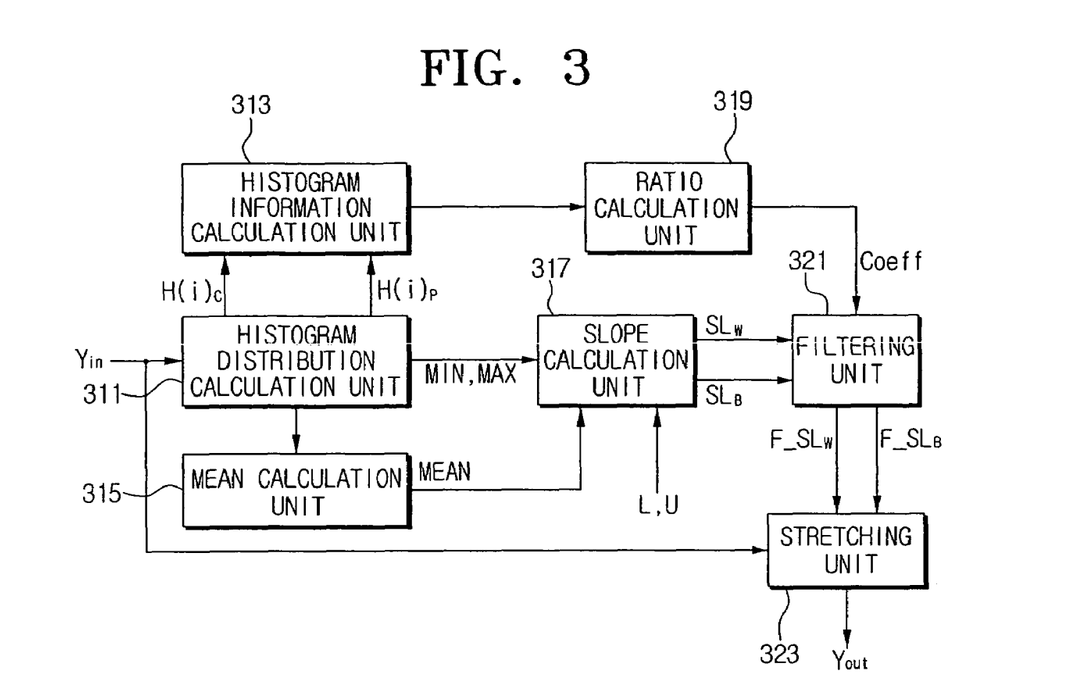
FIG. 3 is a schematic block diagram of a black and white stretching system according to the present invention.
Figure 4:
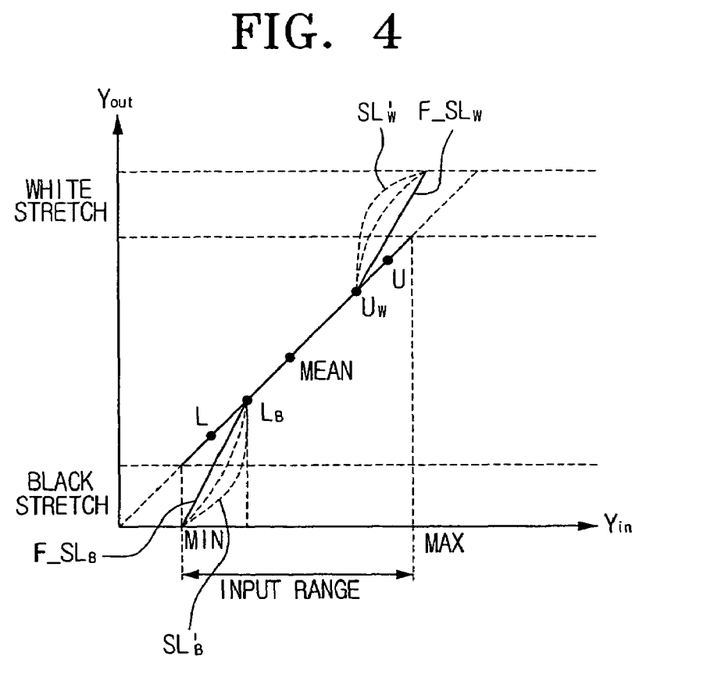
FIG. 4 is a view explaining a stretching process performed by the black and white stretching system illustrated in FIG. 3.

FIG. 3 is a schematic block diagram of a black and white stretching system according to the present invention, and FIG. 4 is a view explaining a stretching process performed by the black and white stretching system illustrated in FIG. 3.

The black and white stretching system according to the present invention includes a histogram distribution calculation unit 311, a histogram information calculation unit 313, a mean calculation unit 315, a slope calculation unit 317, a ratio calculation unit 319, a filtering unit 321, and a stretching unit 323.

The histogram distribution calculation unit 311 calculates a histogram distribution of an input signal of a specified unit, i.e., a histogram distribution H(i)P of the previous image signal and a histogram distribution H(i)C of the present image signal. At this time, the histogram distribution calculation unit 311 detects the sum of the whole gray levels of the input image signal, the total number of pixels, and the maximum level and the minimum level of the input image signal.

The histogram information calculation unit 313 calculates histogram information data Diff_histo which is the difference between the histogram distribution H(i)P of the previous image signal and the histogram distribution H(i)C of the present image signal. Here, the calculated histogram information data Diff_histo is inputted to a ratio calculation unit 319 to be explained later, and the ratio of a picture change is calculated. That is, the histogram information data Diff_histo is given by the following equation 1.

$$Diff\text{-}histo = \sum_{i=m}^{n}(H(i)_C - H(i)_P) \quad [\text{Equation 1}]$$

Here, i is a gray level, and n and m are natural number.

The histogram information data Diff_histo can be calculated using a low gray level part in the case of a black stretching and using a high gray level part in the case of a white stretching, rather than using the whole gray level of the input image signal.

The mean calculation unit 315 calculates a mean level of the input image signal using the sum of the whole gray levels of the input image signal detected by the histogram distribution calculation unit 311 and the total number of pixels.

The slope calculation unit 317 calculates black and white stretching slopes $SL_B$ and $SL_W$ that are associated with the mean level calculated by the mean calculation unit 315. In order to calculate the stretching slopes $SL_B$ and $SL_W$, the slope calculation unit 317 first calculates black and white stretching points $L_B$ and $U_W$ that are associated with the mean level using the mean level and preset stretching points L and U by the following equation.

$$L_B = L + \frac{M-L}{T} \quad [\text{Equation 2}]$$
$$U_W = U + \frac{M-U}{T}$$

Here, T is an association parameter, which is set to a specified level between the preset stretching point L and the mean level, and M is the mean level.

Then, the slope calculation unit 317 calculates the black and white stretching slopes $SL_B$ and $SL_W$ using the minimum level and the maximum level of the input image signal detected by the histogram distribution calculation unit 311.

For example, the process of obtaining the black stretching slope $SL_B$ will be explained. First, the slope calculation unit 317 obtains the black stretching point $L_B$ that is associated with the mean value.

The slope calculation unit 317 obtains the black stretching slope $SL_B$ using the black stretching point $L_B$ calculated by the equation 2 and the minimum level detected by the maximum/minimum detection unit 316. Preferably, by giving a weight value to the black stretching slope $SL_B$, the final black stretching slope $SL'_B$, the degree of which is adjusted, can be obtained by the following equation.

$$SL'_B = \alpha \times (SL_B)^\gamma \quad [\text{Equation 3}]$$

where, $\alpha$ and $\gamma$ are weight values set to adjust the degree of slope.

The ratio calculation unit 319 calculates the degree of change of the present input image signal and the previous input image signal. That is, as defined in the equation 2, the ratio calculation unit calculates the ratio of the picture change Coeff using the histogram information data Diff_histo calculated by the histogram information calculation unit 313. For example, the ratio of the change Coeff can be defined by the following equation.

$$Coeff = \frac{Diff\_histo}{Total} \quad \text{[Equation 4]}$$

Here, Total is the total number of pixels of the input image signal of a specified unit processed by the black and white stretching system.

The filtering unit 321 filters the black stretching slope $SL_B$ and the white stretching slope $SL_W$ corresponding to the ratio of the change Coeff, and outputs the black stretching slope $F\_SL_B$ and the white stretching slope $F\_SL_W$, which vary according to the change of the picture.

For example, if the calculated change ratio Coeff is 128, an intermediate value on the assumption that the change ratio Coeff is in the range of 0 to 255, the filtering unit 321 reflects the present black and white stretching slope corresponding to the present picture and the previous black and white stretching slope corresponding to the previous picture in the same ratio.

Meanwhile, if the calculated change ratio Coeff is small, this means that the degree of the picture change is small, and the filtering unit reflects the previous black and white stretching slope relatively large, while if the calculated change ratio Coeff is large, this means that the degree of the picture change is large, and the filtering unit reflects the present black and white stretching slope relatively large.

Accordingly, the filtering unit 321 performs an improved filtering according to the degree of the picture change, and thus can naturally remove the flicker phenomenon of the picture by means of the black and white stretching.

The stretching unit 323 stretches the gray level range of the input image signal to the hardware range by mapping the black stretching slope $F\_SL_B$ and the white stretching slope $F\_SL_W$ filtered corresponding to the degree of the picture change through the filtering unit 321.

Figure 5:
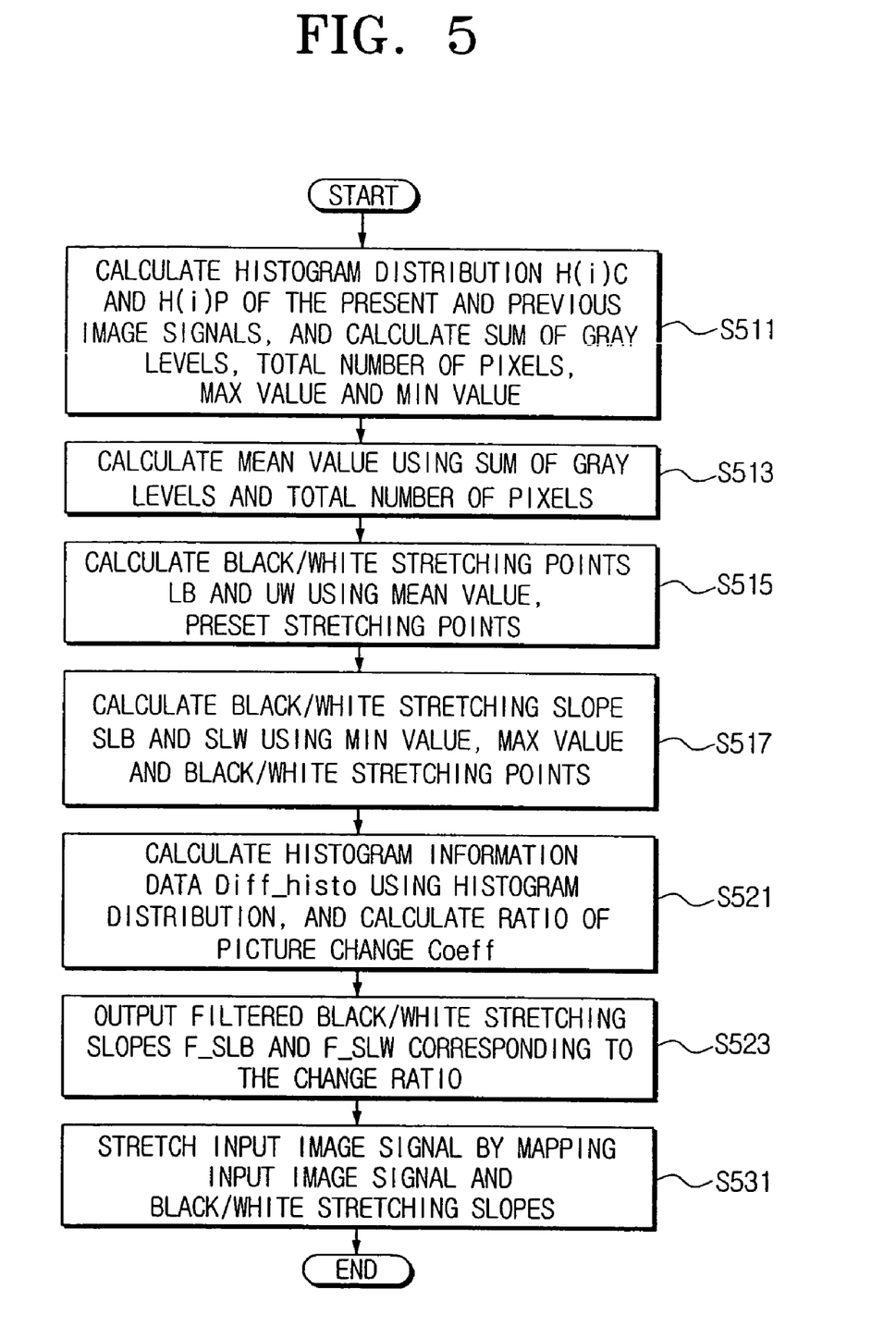
FIG. 5 is a flowchart illustrating a black and white stretching method according to the present invention.

FIG. 5 is a flowchart illustrating a black and white stretching process performed by the black and white stretching system according to the present invention. Referring to FIG. 5, the black and white stretching method according to the present invention will be explained in detail.

The histogram distribution calculation unit 311 calculates the histogram distribution of the input image signal of a specified unit, i.e., the histogram distribution H(i)P of the previous image signal and the histogram distribution H(i)C of the present image signal. At this time, the histogram distribution calculation unit 311 detects the sum of the whole gray levels of the input image signal, the total number of pixels, and the maximum level and the minimum level of the input image signal (step S511).

The mean calculation unit 315 calculates the mean level of the input image signal using the sum of the whole gray levels of the input image signal detected by the histogram distribution calculation unit 311 and the total number of pixels (step S513).

The slope calculation unit 317 calculates the black and white stretching points $L_B$ and $U_W$ that are associated with the mean level using the mean level and the preset stretching points L and U by the equation 2 (step S515).

Also, the slope calculation unit 317 calculates the black and white stretching slopes $SL_B$ and $SL_W$ using the minimum level and the maximum level of the input image signal detected by the histogram distribution calculation unit 311 and the black and white stretching points $L_B$ and $U_W$ (step S517). Preferably, by giving weight values α and γ to the calculated black and white stretching slopes $SL_B$ and $SL_W$ as in the equation 3, the final black stretching slopes $SL'_B$ and $SL'_W$ can be calculated.

Meanwhile, the histogram information calculation unit 313 calculates the histogram information data Diff_histo using the histogram distribution H(i)C of the present input image signal and the histogram distribution H(i)P of the previous image signal calculated by the histogram distribution calculation unit 311. The ratio calculation unit 319 calculates the ratio of the picture change Coeff as defined in the equation 4 using the histogram information data Diff_histo calculated by the histogram information calculation unit 313 (step S521).

Here, the histogram information data Diff_histo is calculated using the low gray level part in the case of the black stretching and using the high gray level part in the case of the white stretching, rather than using the whole gray level of the input image signal.

Then the filtering unit 321 filters the black stretching slope $SL_B$ and the white stretching slope $SL_W$ corresponding to the ratio of the change Coeff calculated by the ratio calculation unit 319, and outputs the filtered black and white stretching slopes $F\_SL_B$ and $F\_SL_W$ (step S523).

The stretching unit 323 stretches the gray level range of the input image signal to the hardware range by mapping the black and white stretching slopes $F\_SL_B$ and $F\_SL_W$ filtered corresponding to the degree of the picture change on the input image signal (step S531).

As described above, the optimum contrast effect can be obtained with respect to any image signal by variably calculating and mapping the black and white stretching slopes according to the mean level of the input image signal and the histogram information.

According to the present invention, the contrast of the picture can be improved by stretching the input image signal using the black and white stretching slopes adaptive to the mean level of the input image signal. Also, the contrast of the picture can further be improved by reflecting the ratio of the picture change to the filter using the histogram information of the present image signal and the previous image signal.

While the present invention has been described in detail, it should be understood that various changes, substitutions and alterations can be made hereto without departing from the spirit and scope of the invention as defined by the appended claims.

What is claimed is:

1. A black and white stretching system comprising:
   a histogram distribution calculation unit for calculating a histogram distribution of an input signal of a specified unit;
   a mean calculation unit for calculating a mean level of the input image signal;
   a slope calculation unit for calculating black and white stretching slopes in association with the mean level;
   a ratio calculation unit for calculating a ratio of a picture change on the basis of the histogram distribution of the present input image signal and a previous input image signal;
   a filtering unit for adjusting the black and white stretching slopes corresponding to the ratio of the picture change; and
   a stretching unit for stretching the input image signal by mapping the adjusted black and white stretching slopes and the input image signal.

2. The system as claimed in claim 1, wherein
the histogram distribution calculation unit detects a sum of whole levels of the input image signal and the total number of pixels, and
the mean calculation unit calculates the mean level of the input image signal using the sum of whole levels and the total number of pixels.

3. The system as claimed in claim 1, wherein
the histogram distribution calculation unit detects a maximum level and a minimum level of the input image signal, and
the slope calculation unit calculates black and white stretching points, $L_B$ and $L_W$, using the maximum level, the minimum level, the mean level, and preset stretching points.

4. The system as claimed in claim 3, wherein the black and white stretching points $L_B$ and $U_W$ calculated by the slope calculation unit are expressed by the following equations $$L_B = L + \frac{M-L}{T}$$
$$U_W = U + \frac{M-U}{T}$$

where, L and U are the preset black and white stretching points, M is the mean level, and T is an association parameter.

5. The system as claimed in claim 3, wherein the slope calculation unit calculates the black and white stretching slopes in association with the mean level using the calculated black and white stretching points, the minimum level, and the maximum level.

6. The system as claimed in claim 1, further comprising
a histogram information calculation unit for calculating histogram information data, Diff_histo, using the histogram distribution of the present input image signal and the previous input image signal calculated by the histogram distribution calculation unit;
wherein the ratio calculation unit calculates the ratio of the picture change using the histogram information data, and provides the ratio of the picture change to the filtering unit.

7. The system as claimed in claim 6, wherein the histogram information data, Diff_histo, calculated by the histogram information calculation unit is given by the following equation $$Diff\text{-}histo = \sum_{i=m}^{n}(H(i)_C - H(i)_P)$$

where, $H(i)_P$ is the histogram distribution of the previous image signal, $H(i)_C$ is the histogram distribution of the present image signal, i is a gray level, and n and m are natural numbers.

8. The system as claimed in claim 6, wherein the ratio of the picture change (Coeff) calculated by the ratio calculation unit is given by the following equation $$Coeff = \frac{Diff\text{-}histo}{Total}$$

where, Total is the total number of pixels of the input image signal.

9. The system as claimed in claim 6, wherein the filtering unit adjusts the present black and white stretching slopes such that if the ratio of the picture change is small, the filtering unit reflects the previous black and white stretching slopes corresponding to the previous input image signal relatively large in comparison to the present black and white stretching slopes corresponding to the present input image signal, and such that if the ratio of the picture change is large, the filtering unit reflects the present black and white stretching slopes corresponding to the present input image signal relatively large in comparison to the previous black and white stretching slopes corresponding to the previous input image signal.

10. A black and white stretching method comprising:
a histogram distribution calculation step of calculating a histogram distribution of an input signal of a specified unit;
a mean calculation step of calculating a mean level of the input image signal;
a slope calculation step of calculating black and white stretching slopes in association with the mean level;
a ratio calculation step of calculating a ratio of a picture change on the basis of the histogram distribution of the present input image signal and a previous input image signal;
a filtering step of adjusting the black and white stretching slopes corresponding to the ratio of the picture change; and
a stretching step of stretching the input image signal by mapping the adjusted black and white stretching slopes and the input image signal.

11. The method as claimed in claim 10, wherein
the histogram distribution calculation step detects a sum of whole levels of the input image signal and the total number of pixels, and
the mean calculation step calculates the mean level of the input image signal using the sum of whole levels and the total number of pixels.

12. The method as claimed in claim 10, wherein
the histogram distribution calculation step detects a maximum level and a minimum level of the input image signal, and
the slope calculation step calculates black and white stretching points using the maximum level, the minimum level, the mean level, and preset stretching points.

13. The method as claimed in claim 12, wherein the black and white stretching points, $L_B$ and $U_W$, calculated at the slope calculation step are expressed by the following equations $$L_B = L + \frac{M-L}{T}$$
$$U_W = U + \frac{M-U}{T}$$

where, L and U are the preset black and white stretching points, M is the mean level, and T is an association parameter.

14. The method as claimed in claim 12, wherein the slope calculation step calculates the black and white stretching slopes in association with the mean level using the calculated black and white stretching points, the minimum level, and the maximum level.

15. The method as claimed in claim 10, further comprising:
- a histogram information calculation step of calculating histogram information data using the histogram distribution of the present input image signal and the previous input image signal calculated at the histogram distribution calculation step;
- wherein the ratio calculation step calculates the ratio of the picture change using the histogram information data, and the filtering step adjusts the black and white stretching slopes on the basis of the ratio of the picture change.

16. The method as claimed in claim 15, wherein the histogram information data, Diff_histo, calculated at the histogram information calculation step is given by the following equation $$Diff\text{-}histo = \sum_{i=m}^{n} (H(i)_C - H(i)_P)$$

where, $H(i)_P$ is the histogram distribution of the previous image signal, $H(i)_C$ is the histogram distribution of the present image signal, i is a gray level, and n and m are natural numbers.

17. The method as claimed in claim 15, wherein the ratio of the picture change (Coeff) calculated at the ratio calculation step is given by the following equation $$Coeff = \frac{Diff\text{-}histo}{Total}$$

where, Total is the total number of pixels of the input image signal.

18. The method as claimed in claim 15, wherein the filtering step adjusts the present black and white stretching slopes such that if the ratio of the picture change is small, the filtering step reflects the previous black and white stretching slopes corresponding to the previous input image signal relatively large in comparison to the present black and white stretching slopes corresponding to the present input image signal, and such that if the ratio of the picture change is large, the filtering step reflects the present black and white stretching slopes corresponding to the present input image signal relatively large in comparison to the previous black and white stretching slopes corresponding to the previous input image signal.

* * * * *